| United States Patent [19] | [11] Patent Number: 4,981,889 |
|---|---|
| Baba et al. | [45] Date of Patent: Jan. 1, 1991 |

[54] PLASTISOL COMPOSITION

[75] Inventors: Akira Baba, Ibaraki; Takashi Maebashi; Takashi Nakayama, both of Takatsuki, all of Japan

[73] Assignee: Sunstar Giken Kabushiki Kaisha, Osaka, Japan

[21] Appl. No.: 341,704

[22] Filed: Apr. 21, 1989

[30] Foreign Application Priority Data

Apr. 26, 1988 [JP] Japan .................................. 63-107099

[51] Int. Cl.$^5$ .......................... C08K 5/12; C08K 5/521
[52] U.S. Cl. ..................................... 524/109; 524/143; 524/145; 524/297; 524/314; 525/111; 525/121
[58] Field of Search ............... 525/124, 127, 129, 111, 525/121; 524/569, 109, 112, 114, 206, 257, 296, 297, 143, 145, 314, 196

[56] References Cited

U.S. PATENT DOCUMENTS

| 3,423,354 | 1/1969 | Jones | 524/145 |
|---|---|---|---|
| 3,644,229 | 2/1972 | Butler et al. | 525/129 |
| 3,917,550 | 11/1975 | Clas et al. | 524/297 |
| 4,623,686 | 11/1986 | Hurnik et al. | 524/659 |

*Primary Examiner*—Veronica P. Hoke
*Attorney, Agent, or Firm*—Wegner, Cantor, Mueller & Player

[57] ABSTRACT

A plastisol composition which comprises a polyvinyl chloride, a plasticizer and a blocked isocyanate compound as an adhesion-modifier, supplemented with a powdery curing agent for an epoxy resin having a melting point of 50° to 150° C. which is surface-treated. The plastisol composition of the present invention has an improved adhesion property at a lower temperature and is useful as an adhesive, sealing agent and coating agent.

8 Claims, No Drawings

PLASTISOL COMPOSITION

The present invention relates to a plastisol composition, more particularly, a plastisol composition comprising polyvinyl chloride as a main component, a plasticizer, a blocked isocyanate compound as an adhesion-modifier and a powdery curing agent having a melting point of 50° to 150° C. which is surface-treated, said composition having an improved adhesion properties when gelated under low temperature conditions such as at 110° to 130° C. for 15 to 30 minutes.

TECHNICAL BACKGROUND AND PRIOR ART

A plastisol composition comprising polyvinyl chloride as a main component has been employed as adhesives, sealant or coating material in various fields. As such a type of plastisol composition, for example, there is known a composition which comprises a polyvinyl chloride, a plasticizer and a blocked compound of diisocyanate polymer with a long-chain alkylated phenol as an adhesion-modifier (cf. Japanese Patent First Publication No. 41278/1987). This plastisol composition, however, has been found to have less adhesion properties under low temperature conditions such as 110° to 130° C., though it has an excellent storage stability under conditions of high temperature and high humidity without foaming and discoloration and is capable of forming a gelated compound with an excellent adhesion strength under high temperature conditions.

SUMMARY OF THE INVENTION

The present inventors have intensively studied to improve adhesion properties of the plastisol composition under low temperature conditions, and as a result, it was found that the adhesion properties under low temperature conditions can remarkably be improved by adding a specific curing agent for an epoxy resin to the above plastisol composition.

That is, the present invention provides a plastisol compostion which comprises a polyvinyl chloride, a plasticizer and a blocked isocyanate compound as an adhesion-modifier, supplemented with a powder curing agent for an epoxy resin having a melting point of 50° to 150° C. which is surface-treated.

DETAILED DESCRIPTION OF THE INVENTION

The polyvinyl chloride used in the present invention may be those commonly used for plastisol, including those prepared by polymerizing vinyl chloride alone or together with other copolymerizable monomer by emulsion polymerization, suspension polymerization, bulk polymerization, solution polymerization and the like. Such copolymerizable monomer includes, for example, vinyl esters of ($C_2$-$C_{10}$)alkanoic acids (e.g. vinyl acetate, vinyl propionate, vinyl laurate, etc.), acrylic acid ($C_1$-$C_4$)alkyl esters (e.g. methyl acrylate, ethyl acrylate, butyl acrylate, etc.), methacrylic acid ($C_1$-$C_4$)alkyl esters (e.g. methyl methacrylate, ethyl methacrylate, etc.), maleic acid di($C_1$-$C_4$)alkyl esters (e.g. dibutyl maleate, diethyl maleate, etc.), fumaric acid di($C_1$-$C_4$)alkyl esters (e.g. dibutyl fumarate, diethyl fumarate, etc.), vinyl ($C_1$-$C_{10}$)-alkyl ethers (e.g. vinyl methyl ether, vinyl butyl ether, vinyl octyl ether, etc.), vinyl cyanates (e.g. acrylonitrile, methacrylonitrile, etc.), α-olefins (e.g. ethylene, propylene, styrene, etc.), vinyl halogenides or vinylidene halogenides other than vinyl chloride (e.g. vinylidene chloride, vinyl bromide, etc.), and the like.

The plasticizer used in the present invention may be those commonly used for polyvinyl chloride and includes, but not limited to, phthalic acid di($C_4$-$C_{10}$)alkyl or ($C_4$-$C_{10}$)alkyl-($C_6$-$C_8$)aryl esters such as di(n-butyl) phthalate, octyldecyl phthalate, diisodecyl phthalate, di(2-ethylhexyl) isophthalate, di(2-ethylhexyl) phthalate, butylbenzyl phthalate, dioctyl phthalate (DOP), dinonyl phthalate, diisononyl phthalate (DINP), diheptyl phthalate and butyl phthalyl butyl glycolate; aliphatic dibasic acid esters such as dioctyl adipate, didecyl adipate, dioctyl sebacate, di(2-ethylhexyl) adipate, diisodecyl adipate, di(2-ethylhexyl) azelate, dibutyl sebacate and di(2-ethylhexyl) sebacate; phosphoric acid esters such as tricresyl phosphate, trioctyl phosphate, tributyl phosphate, tri-2-ethylhexyl phosphate and 2-ethylhexyldiphenyl phosphate; epoxy type plasticizers such as epoxydized soybean oil and 2-ethylhexyl epoxydized tall oil fatty acid ester, and other polyester type plasticizers, which are used alone or in combination of at least two thereof. Such plasticizer has an influence on viscosity of the plastisol and properties of the gellated product, and may usually be used in an amount of 65-130 parts (parts by weight, hereinafter the same) per 100 parts of polyvinyl chloride.

The blocked isocyanate compound used in the present invention as an adhesion-modifier is prepared by blocking a diisocyanate polymer with a conventional procedure.

The above diisocyanate polymer can be prepared by a conventional method, that is, by polymerizing a diisocyanate monomer such as an aliphatic diisocyante (e.g. hexamethylene diisocyanate, lysine diisocyanate), an alicyclic diisocyanate (e.g. hydrogenated diphenylmethane diisocyanate, isophorone diisocyanate, hydrogenated tolylene diisocyanate) and an aromatic diisocyanate (e.g. tolylene diisocyanate, diphenylmethane diisocyanate, naphthylene diisocyanate, xylene diisocyanate) in an inert solvent (e.g. ethyl acetate, methyl acetate, butyl acetate, chlorobenzene) or in a plasticizer (phthalic acid esters, phosphoric acid esters, adipic acid esters, trimellitic acid esters). The diisocyanate polymer may also be an isocyanate-terminated urethane prepolymer which is prepared by reacting a polyalkylene ether polyol with an excess amount of the above diisocyanate monomer.

A blocking agent used for blocking the above diisocyanate polymer includes ($C_2$-$C_4$) alcohols such as ethanol, propanol, butanol and isobutanol; phenols such as phenol, cresol, xylenol and p-nitrophenol; long-chained ($C_4$-$C_{10}$)-alkylphenols such as butylphenol, hexylphenol, octylphenol and nonylphenol; activated methylene compounds such as ethyl malonate, ethyl acetoacetate and acetylacetone; ($C_2$-$C_4$)-alkanoic or alkenoic acid amides such as acetamide, acrylamide and acetanilide; ($C_2$-$C_6$)dibasic alkanoic acid imides such as succinimide and maleinimide; mono- or di-($C_1$-$C_4$)-alkyl-substituted imidazoles such as 2-ethylimidazole and 2-ethyl-4-methylimidazole; lactams such as 2-pyrrolidone and ε-caprolactam; oximes of ketone or aldehyde such as acetoxime, methyl ethyl ketoxime, cyclohexanone oxime and acetaldoxime; ethyleneimine, bisulfates and the like, preferably long-chained ($C_4$-$C_{10}$)alkylphenols, lactams and oximes, in view point of storage stability and curing characteristics, and most preferably butylphenol, hexylphenol, octylphenol, nonylphenol, ε-caprolactam, methyl ethyl ketoxime and cyclohexanone oxime.

These blocking agents are reacted with the diisocyanate polymer to prepare a blocked isocyanate compound. In this reaction, about 0.90–1.5 equivalents, preferably about 1.0–1.3 equivalents of the blocking agent is employed per 1 mol of the isocyanate group. When the blocking agent is used in an amount less than 0.9 equivalents, resulting blocked isocyanate compound may contain free isocyante groups to have a bad influence on the storage stability, and on the other hand, when the amount of the blocking agent exceeds 1.5 equivalents, the unreacted blocking agent may migrate or volatilize to cause some problems or it is not preferable from economical standpoint.

The thus prepared blocked isocyanate compound, as a 20% solution in di(2-ethylhexyl) phthalate, may be used in an amount ranging from 35 to 70 parts (7 to 14 parts as an effective component) per 100 parts of polyvinyl chloride.

The powdery curing agent for an epoxy resin which is surface-treated (hereinafter referred to as "surface-treated curing agent") of the present invention is prepared by dispersing a powdery curing agent for an epoxy resin in a suitable insoluble medium and then adding a surface-treating agent thereto, or alternatively, by spraying a surface-treating agent to a powdery curing agent which is in a fluidized form in a gas stream.

The above powdery curing agent may be formed to have a suitable form with conventional powdering procedures (using, for example, hammer mill grinder, jet grinder, ball mill grinder) and is required to have a melting point of from 50° to 150° C., preferably from 60° to 120° C. When the melting point is below 50° C., the powdery curing agent may coagulate when stored, thereby making difficult for handling, and when the melting point exceeds 150° C., adhesion property of the obtained plastisol composition when gelated under low temperature conditions may be deteriorated.

Such powdery curing agent includes aromatic amines (e.g. metha-phenylenediamine, para-phenylenediamine, diaminodiphenylmethane); phthalic or succinic acid anhydrides having optionally halogen or ($C_1$–$C_4$)alkyl substituent (e.g. phthalic anhydride, 3-chlorophthalic anhydride, 4-chlorophthalic anhydride, tetrahydrophthalic anhydride, anhydrous dimethylsuccinate); imidazoles having optionally ($C_1$–$C_{12}$)-alkyl or phenyl substituent (e.g. imidazole, 2-methylimidazole, 2-undecylimidazole, 4-methylimidazole, 2-phenylimidazole) and the like. Further, the powdery curing agent includes the following group A compounds or reaction products of group A compounds and group B compounds.

[Group A compounds]: aliphatic polyamines such as ethylenediamine, diethylenetriamine, triethylenetetramine, tetraethylenepentamine and diethylaminopropylamine; aromatic polyamines such as diaminodiphenylsulfone and bis(aminomethyl)diphenylmethane; dibasic or tribasic carboxylic acid anhydrides such as trimellitic anhydride, pyromellitic anhydride, hexahydrophthalic anhydride and succinic anhydride; dibasic ($C_2$–$C_{10}$)carboxylic acid hydrazides such as adipic acid hydrazide, succinic acid hydrazide, sebacic acid hydrazide and terephthalic acid hydrazide; dicyandiamide; mono- or di-($C_1$–$C_{12}$)alkyl-substituted imidazoles such as 2-ethylimidazole, 2-isopropylimidazole, 2-dodecylimidazole and 2-ethyl-4-methylimidazole; carboxylic acid salts of the above imidazoles; and the like.

[Group B compounds]: dibasic ($C_2$–$C_{10}$) carboxylic acids such as succinic acid, adipic acid, sebacic acid, phthalic acid, terephthalic acid and dimer acid; ($C_1$–$C_4$)-alkane- or ($C_6$–$C_8$)aryl-sulfonic acids such as ethanesulfonic acid and p-toluenesulfonic acid; isocyanates such as tolylene diisocyanate, 4,4'-diphenyl diisocyanate and hexamethylene diisocyanate; p-hydroxystyrene resin; phenol resin; epoxy resin; and the like.

Amoung the above powdery curing agents having a melting point of 50° to 150° C., preferable are those containing at least two active hydrogens of amino group in a molecule [for example, the above aromatic amines; addition product of aliphatic polyamines (e.g. ethylenediamine, diethylenetriamine, triethylenetetramine, tetraethylenepentamine, hexamethylenediamine) with an epoxy resin; condensation products of an aliphatic polyamine and an aliphatic or aromatic dicarboxylic acid; polyureas such as a tolylenediisocyanate adduct of and hexamethylenediisocyanate adduct of an aliphatic amine; modified compounds such as succinic acid hydrazide, adipic acid hydrazide and dicyandiamide] or those containing at least one tertiary amino group in a molecule [for example, the above imidazoles; adducts of a secondary amino group-containing compound (e.g. imidazoles, carboxylic acid salts of imidazoles, dimethylamine, diethylamine, dipropylamine, di(hydroxymethyl)amine, di(hydroxyethyl)amine) with an epoxy resin]. Preferable powdery curing agents in view of easiness of gelation and storage stability are imidazole derivatives containing at least one hydroxy group in a molecule [e.g. imidazoles having optionally mono- or di-($C_1$–$C_{12}$)alkyl or phenyl substituent such as imidazole, 2-methylimidazole, 2-ethylimidazole, 2-ethyl-4-methylimidazole, 2-isopropylimidazole, 2-undecylimidazole and 2-phenylimidazole; adducts of a salt of the imidazoles with a carboxylic acid (e.g. acetic acid, lactic acid, salicylic acid, benzoic acid, adipic acid, phthalic acid, citric acid, tartaric acid, maleic acid, trimellitic acid) and an epoxy compound containing at least one epoxy group in a molecule (e.g. butyl glycidyl ether, hexyl glycidyl ether, phenyl glycidyl ether, p-xylyl glycidyl ether, glycidyl acetate, glycidyl butylate, glycidyl hexoate, glycidyl benzoate)].

The surface-treating agent includes, for example, carboxylic acids such as ($C_1$–$C_4$)alkanoic acids (e.g. formic acid, acetic acid, propionic acid, butyric acid), dibasic ($C_2$–$C_8$)alkanoic acids (e.g. adipic acid, succinic acid), phenyl-dicarboxylic acids (e.g. phthalic acid, terephthalic acid); ($C_1$–$C_4$)alkane- or ($C_5$–$C_8$)aryl-sulfonic acids (e.g. ethanesulfonic acid, p-toluenesulfonic acid); isocyanates (e.g. phenyl isocyanate, 4,4'-diphenylmethane diisocyanate, tolylene diisocyanate, hexamethylene diisocyanate); ($C_2$–$C_4$)-alkanoic or dibasic ($C_2$–$C_8$)alknoic acid halides (e.g. acetyl chloride, propionic acid chloride, succinic acid chloride, adipic acid chloride); ($C_2$–$C_4$)alkanoic or phenyl-dicarboxylic acid anhydrides (e.g. acetic anhydride, propionic anhydride, phthalic anhydride); epoxy compounds containing at least one epoxy group; p-hydroxystyrene resins; phenol resins and the like, preferable one being isocyanates containing at least one isocyanate group in a molecule, particularly tolylene diisocynate and 4,4'-diphenylmethane diisocyanate.

The surface-treated curing agent thus prepared from the powdery curing agent and the surface-treating agent may be used in an amount ranging from 0.3 to 5 parts, preferably from 0.6 to 3 parts, per 100 parts of polyvinyl chloride resin. When the used amount of the surface-treated curing agent is below 0.3 parts, the desired effect of improving adhesion properties at a lower temperature is not attained, and when the amount is over 5 parts, the adhesion properties at a lower temperature is no more improved but it is rather economically disadvantageous.

In place of a part of the surface-treated curing agent, the plastisol composition of the present invention may further contain a conventional latent curing agent for an epoxy resin (e.g. dicyandiamide, phthalic anhydride, trimellitic anhydride, tetrahydrophthalic anhydride, hexahydrophthalic anhydride, adipic acid dihydrazide, sebacic acid dihydrazide, isophthalic acid dihydrazide, terephthalic acid dihydrazide, diaminodiphenylsulfone, a phenol resin, a melamine resin, a urea resin) to reduce the cost.

The plastisol composition of the present invention comprises the polyvinyl chloride, the plasticizer, the blocked isocyanate compound and the surface-treated curing agent (and optionally latent curing agent) in the above fixed ratio. The plastisol composition of the present invention may further contain conventional additives such as fillers (precipitated potassium carbonate which may be surface-treated with fatty acid or resin acid, heavy calcium carbonate, calcium oxide, clay, talc, silica, hollow glass powder), dehydrochlorination-inhibiting agents (e.g. metallic soap, an organic tin compound), heat stabilizers, pigments (e.g. titanium white), and the like.

The present invention is more specifically illustrated by the following Examples and Comparative Examples but should not be construed to be limited thereto.

EXAMPLES 1 TO 2 AND COMPARATIVE EXAMPLES 1 to 2

(1) Preparation of plastisol compositions

The components listed in the following Table 1 were mixed and dispersed and degassed under vacuum to prepare plastisol compositions.

(2) Test for adhesion properties at a lower temperature

Each composition prepared above was applied onto a cationic electro-deposition steel plate and the plate was heated at 120° C. for 20 minutes, followed by peel test with nail to evaluate adhesion properties of each composition.

The evaluation was made in two-rank i.e.
◎ : excellent
x: wrong
The results are shown in Table 1.

TABLE 1

| Component | Ex. 1 | Ex. 2 | Comp. Ex. 1 | Comp. Ex. 2 |
|---|---|---|---|---|
| Polyvinyl chloride*1 | 60 | 60 | 60 | 60 |
| Polyvinyl chloride*2 | 40 | 40 | 40 | 40 |
| DOP | 30 | 30 | 30 | 30 |
| Blocked isocyanate compound*3 | 50 | 50 | 50 | 50 |
| Surface-treated curing agent*4 | 2.4 | 0.6 | — | — |
| Latent curing agent*5 | — | 2 | — | — |
| Surface-treated calcium carbonate*6 | 25 | 25 | 25 | 35 |
| Hollow glass powder*7 | 6 | 6 | 6 | — |
| Heavy calcium carbonate*8 | — | — | — | 35 |
| Kerosine | 15 | 15 | 15 | 15 |
| Calcium oxide*9 | 10 | 10 | 10 | 10 |
| Specific gravity | 1.19 | 1.19 | 1.19 | 1.37 |
| Adhesion properties at a lower temp. | ◎ | ◎ | x | x |

(note)
*1 Kaneka PCH-12Z (manufactured by Kanegahuchi Kagaku Kogyo Kabushiki Kaisha)
*2 Zeon G-51 (manufactured by Nippon Zeon Co., Ltd., blended type)
*3 S-202 (blocked aromatic diisocyanate polymer with nonylphenol, manufactured by Kyoeisha Fats and Oils Co., Ltd., used as a 20% solution in DOP)
*4 Nobacure-3721 (manufactured by Asahi Chemical Industries, Co., Ltd.)
*5 ADH (adipic acid dihydrazide) (manufactured by Nippon Hydrazine Industries Co., Ltd., used as a 50% solution in DINP)
*6 SP (manufactured by Takehara Kagaku Co., Ltd.)
*7 Glassballoon Z-37 (manufactured by Asahi Glass Co., Ltd., specific gravity: 0.36)
*8 Whiton B (manufactured by Shiraishi Calucium Co., Ltd.)
*9 QCX (manufactured by Inoue Sekkai Co., Ltd.)

We claim:
1. In a plastisol composition comprising a polyvinyl chloride, a plasticizer and a blocked isocyanate compound, the improvement which comprises further a powder curing agent for an epoxy resin having a melting point of 50° to 150° C., said powder curing agent being treated with a surface-treating agent selected from the group consisting of ($C_1$–$C_4$)alkanoic acids, dibasic ($C_2$–$C_8$)alkanoic acids, phenyl-dicarboxylic acids, ($C_1$–$C_4$)alkane- or ($C_5$–$C_8$)aryl-sulfonic acids, isocyanates, ($C_2$–$C_4$)alkanoic or dibasic ($C_2$–$C_8$)alkanoic acid halides, ($C_2$–$C_4$)alkanoic or phenyl-dicarboxylic acid anhydrides, epoxy compounds containing at least one epoxy group, p-hydroxystyrene resins and phenol resins.

2. The composition according to claim 1, wherein the powdery curing agent is a member selected from the group consisting of aromatic amines, addition products of an aliphatic polyamine with an epoxy resin, condensation products of an aliphatic polyamine and an aliphatic or aromatic discarboxyilic acid, polyureas, succinic acid hydrazide, adipic acid hydrazide, dicyandiamide, imidazoles, and adducts of a secondary amino group-containing compound with an epoxy resin.

3. The composition according to claim 1, wherein the powdery curing agent is a member selected from the group consisting of imidazole compounds containing at least one hydroxy group in a molecule, adducts of a salt of the imidazoles with a carboxylic acid, and an epoxy compound containing at least one epoxy group in a molecule.

4. The plastisol composition of claim 1 which additionally comprises a latent curing agent for an epoxy resin.

5. The plastisol composition of claim 1 which comprises 100 parts by weight of the polyvinyl chloride, 65 to 130 parts by weight of the plasticizer, 35 to 70 parts by weight of the blocked isocyanate compound, and 0.3 to 5 parts by weight of the powdery curing agent.

6. The plastisol composition of claim 1 wherein said blocked isocyanate compound is prepared by blocking a diisocyanate polymer with a blocking agent selected from ($C_2$–$C_4$)alcohold, phenols, ($C_4$–$C_{10}$)alkylphenols, activated methylene compounds, ($C_2$–$C_4$)alkanoic or alkenoic acid amides, ($C_2$–$C_6$)dibasic alkanoic acid imides, mono- or di($C_1$–$C_4$)alkyl-substituted imidazoles, lactams, oximes of ketone or aldehyde, ethyleneimine, and bisulfate.

7. The plastisol composition of claim 1 wherein said powdery curing agent is a member selected from the group consisting of aromatic amines, phthalic or succinic acid anhydrides having optionally halogen or ($C_1$-$C_4$)alkyl substituent and imidazoles having optionally ($C_1$-$C_{12}$)alkyl or phenyl substituent.

8. The plastisol composition of claim 1 wherein said powdery curing agent is a member selected the group A compounds or reaction products of group A compounds and group B compounds:

[Group A compounds]: aliphatic polyamines, aromatic polyamines, dibasic or tribasic carboxylic acid anhydrides, dibasic ($C_2$-$C_{10}$)carboxylic acid hydrazides, dicyandiamide, mono- or di-($C_1$-$C_{12}$)alkyl-substituted imidazoles, carboxylic acid salts of the imidazoles;

[Group B compounds]: dibasic ($C_2$-$C_{10}$) carboxylic acids, ($C_1$-$C_4$)alkane- or ($C_6$-$C_8$)aryl-sulfonic acids, isocyanates, p-hydroxystyrene resin, phenol resin and epoxy resin.

* * * * *